United States Patent [19]

Liao

[11] Patent Number: 5,028,341

[45] Date of Patent: Jul. 2, 1991

[54] WELL SERVICING FLUID

[75] Inventor: Andrew Liao, Houston, Tex.

[73] Assignee: Baroid Technology, Inc., Houston, Tex.

[21] Appl. No.: 626,902

[22] Filed: Dec. 31, 1990

[51] Int. Cl.$^5$ .............................................. C09K 7/02
[52] U.S. Cl. ............................. 252/8.512; 252/8.51; 252/8.513; 252/8.514; 106/38.35; 166/285; 166/294; 166/295; 524/5
[58] Field of Search ................ 252/8.51, 8.511, 8.514, 252/8.513, 8.512; 166/285, 294, 295; 106/38.35, 90, 119

[56] References Cited

U.S. PATENT DOCUMENTS

| | | | |
|---|---|---|---|
| 2,775,557 | 12/1956 | Morgan | 252/8.51 |
| 3,637,031 | 1/1972 | Hull et al. | 252/8.51 |
| 3,738,437 | 6/1973 | Scheuerman | 252/8.51 |
| 3,953,335 | 4/1976 | Jackson | 252/8.51 |
| 3,986,964 | 10/1976 | Smithey | 252/8.512 |
| 4,008,164 | 2/1977 | Watson et al. | 252/8.554 X |
| 4,015,991 | 4/1977 | Persinski et al. | 106/90 |
| 4,600,515 | 7/1986 | Gleason et al. | 252/8.51 |
| 4,664,818 | 5/1987 | Halliday et al. | 252/8.511 |
| 4,883,125 | 11/1989 | Wilson et al. | 166/291 |

Primary Examiner—Robert L. Stoll
Assistant Examiner—Chhaya Sayala
Attorney, Agent, or Firm—Browning, Bushman, Anderson & Brookhart

[57] ABSTRACT

An additive for well servicing fluids containing a partially hydrolyzed acrylamide for use in downhole environments having a high calcium ion content comprising an alkali metal bicarbonate, a water-soluble carboxylic acid and a copolymer of acrylamide, an acrylic acid and 2-acrylamido-2-methylpropanesulfonic acid, the additive being used to formulate aqueous well servicing fluids, particularly drilling fluids, and for a method of treating an aqueous well servicing fluid containing partially hydrolyzed acrylamide to prevent unwanted reactions between calcium ions and the partially hydrolyzed polyacrylamide.

20 Claims, No Drawings

WELL SERVICING FLUID

BACKGROUND OF THE INVENTION

1. Field of the Invention

The present invention relates to well servicing fluids and, more particularly, to aqueous well drilling fluids containing partially hydrolyzed polyacrylamides.

2. Description of the Background

In the drilling of oil and gas wells and other earth boreholes, a fluid, commonly referred to as mud, is pumped down through the drill pipe and returns up the annulus between the drill pipe and the borehole, the mud serving the dual purpose of cooling the bit and removing cuttings as the drilling proceeds. It is common to employ drilling fluids or muds which contain various substances which will form a thin barrier or coating on the well bore to prevent the hole from sloughing. Additionally, this thin cake or coating on the well bore prevents loss of the drilling mud or fluid out of the well bore into the adjoining formation. The problem of sloughing and concomitant fluid loss is particularly acute in the case of formations which contain shale. Shale formations, when contacted with aqueous drilling or other well servicing fluids, undergo heaving leading to sloughing of the well bore, resultant erosion and loss of drilling fluid into the formation.

It is well known that a drilling or well servicing fluid containing partially hydrolyzed polyacrylamide (PHPA) is quite effective in overcoming the problems encountered in shale formations. PHPA, when in contact with water, hydrates immediately, the hydrated polymer molecules absorbing onto the surfaces of both the cuttings and the well bore, thereby forming a stationary, thin coating. This coating prevents hydration of the cuttings permitting their removal at the surface with conventional shale shakers and other solids separation equipment. Additionally, the coating formed by the PHPA on the well bore surface prevents the active shale from sloughing and the well bore from erosion. However, it is known that as the drilling continues, the PHPA concentration in the drilling fluid is depleted due to the fact that there are new surfaces of cuttings and well bore for coating with the PHPA. Accordingly, it is generally necessary to monitor and periodically add additional quantities of PHPA to the drilling fluid.

In addition to the loss of PHPA in the drilling fluid by absorption on new cuttings and new exposed well bore, the PHPA can be destroyed by high solution pH and interaction with multiple valence cations, such as calcium, magnesium, etc. High solution pH values cause the PHPA polymers to hydrate to polyacrylate salts, while it is believed that multivalent cations, e.g. calcium, cause the PHPA molecules to cross-link or to precipitate out of the drilling fluid. It is known that when PHPA containing drilling fluids are contaminated with excess calcium ion, the fluid becomes viscous and the ability of the PHPA to decrease fluid loss decreases dramatically. While the loss of PHPA by absorption on new cuttings or well bore can be overcome simply by adding more PHPA to the drilling mud, the destruction of PHPA due to excess calcium or other multivalent cations can only effectively be prevented by preventing or at least interfering with the reaction between the calcium or other such ions and the PHPA.

In a typical oil or gas well, excess calcium ions can be encountered either from calcium enriched formations encountered during the drilling operations or from cementing operations, e.g. the setting of casing. For example, it is common to use cementing operations to isolate various formations vertically disposed in the well bore. In these cases, once a cementing operation has been completed, it is necessary to drill through the cement column which inherently exposes the drilling fluid to high calcium leaching from the cementing cuttings. Accordingly, it would be desirable to have an aqueous-based drilling or well servicing fluid containing partially hydrolyzed polyacrylamides which will be stable in the presence of calcium and other similar multivalent cations.

SUMMARY OF THE INVENTION

It is therefore an object of the present invention to provide improved well servicing fluids.

Another object of the present invention is to provide an improved well servicing fluid, e.g. a drilling fluid, containing partially hydrolyzed polyacrylamide which is stable in drilling environments containing high concentrations, i.e. from about 500 to about 5,000 parts per million of calcium ion.

Still another object of the present invention is to provide an additive for well servicing fluids containing partially hydrolyzed polyacrylamides which can be added to the fluid to prevent their destabilization by multivalent cations, such as calcium.

Still a further object of the present invention is to provide a method of treating an aqueous well servicing fluid containing partially hydrolyzed polyacrylamides to prevent unwanted reactions between calcium ions and the partially hydrolyzed polyacrylamides during well servicing operations.

The above and other objects of the present invention will become apparent from the description given herein and the appended claims.

In one aspect, the present invention provides a well servicing fluid, e.g. a drilling fluid, comprising an aqueous medium, from about 0.2 to about 5 pounds per barrel of a partially hydrolyzed polyacrylamide having an average molecular weight greater than 1 million and a calcium-controlling additive. The calcium-controlling additive comprises an alkali metal bicarbonate, a water-soluble, carboxylic acid and a copolymer of acrylamide, an acrylic acid and 2-acrylamido-2-methylpropanesulfonic acid.

In another embodiment of the present invention, there is provided an additive which can be incorporated into well servicing fluids containing partially hydrolyzed polyacrylamides, the additive including an alkali metal bicarbonate, a water-soluble carboxylic acid and a copolymer of acrylamide, an acrylic acid and 2-acrylamido-2-methylpropanesulfonic acid.

In yet another embodiment of the present invention, there is provided a method of treating an aqueous, well servicing fluid containing partially hydrolyzed polyacrylamide to prevent unwanted reaction between calcium ions and the partially hydrolyzed polyacrylamide comprising adding to the well servicing fluid an effective amount of the additive described above.

DESCRIPTION OF THE PREFERRED EMBODIMENTS

The well servicing fluid of the present invention is primarily intended for use as a drilling fluid or mud, although it will be understood that the well servicing fluid can be used in other operations in earth boreholes,

EXAMPLE 3

A series of exemplary drilling fluids incorporating various organic additives were prepared using the base fluid of Example 1, after which the fluids were contaminated with excess calcium (5,000 ppm). The rheological properties of the formulations after addition of calcium were measured to determine the effectiveness of calcium tolerance of each of the additives. The data is shown in Table 3 below.

TABLE 3

| Sample No. | #6 | #7 | #8 | #9 | #10 | #11 | #12 |
|---|---|---|---|---|---|---|---|
| Base fluid, bbl | 1.0 | 1.0 | 1.0 | 1.0 | 1.0 | 1.0 | 1.0 |
| Phosphonic polyacrylate[1], lb | 2.0 | — | — | — | — | — | — |
| Lignosulfonate, lb | — | 2.0 | — | — | — | — | — |
| PAA/AMPS[2] (80/20 by weight), lb | — | — | 2.0 | — | — | — | — |
| Polyanionic cellulose, lb | — | — | — | 2.0 | — | — | — |
| PAAm/AMPS[3] (90/10), lb | — | — | — | — | 2.0 | — | — |
| PAAm/PAA/AMPS[4] (60/30/10), lb | — | — | — | — | — | 2.0 | — |
| AMPS (58%), lb | — | — | — | — | — | — | 2.0 |
| Calcium chloride, lb | 4.2 | 4.2 | 4.2 | 4.2 | 4.2 | 4.2 | 4.2 |
| Rheological Properties | | | | | | | |
| PV | 10 | 12 | 11 | 17 | 15 | 14 | 12 |
| YP | 11 | 8 | 9 | 2 | 5 | 12 | 9 |
| 10 sec gel/10 min gel | 12/22 | 15/36 | 8/14 | 1/2 | 8/22 | 10/18 | 9/16 |
| pH | 11.0 | 7.5 | 9.5 | 10.5 | 9.5 | 9.5 | 8.5 |
| API filtrate, ml/30 min | 58 | 45 | 45 | 5 | 25 | 20 | 58 |
| Region classification | I | II | II | III | III | IV | II |

[1]Phosphonate polyacrylate polymer (U.S. Pat. No. 4,782,120) is marketed by Baroid Technology, Inc. under the trade name THERMA-THIN.
[2]PAA/AMPS (80/20) is a copolymer of PAA and AMPS and is marketed by Baroid Technology, Inc. under the trade name THERMA-THIN DP or by Calgon as O15924J in emulsion form (30% activity).
[3]PAAm/AMPS (90/10) is a copolymer of PAAm and AMPS in emulsion form (25% activity) and is marketed by Calgon as E-2428.
[4]PAAm/PAA/AMPS (60/30/10 by weight) is a copolymer of PAAm, PAA and AMPS having an average molecular weight of from about 5 to about 10 million in emulsion form (25% activity) and is marketed by Calgon as O2R924.
Abbreviation:
PAA: Polyacrylic acid
PAAm: Polyacrylamide
AMPS: 2-Acrylamido-2-methylpropanesulfonic acid As can be seen from the data in Table 3, the only composition which meets the criteria classified in Region IV is Sample #11. This composition, after calcium contamination, exhibited higher yield point than that of the base fluid while the API filter loss remains the same as the base fluid. (Compare Sample #11 with Sample #1 of Example 1).

EXAMPLE 4

This example demonstrates that the addition of both sodium bicarbonate and acetic acid to the formulation of Sample #11 results in a significant improvement in calcium sequestering. Sample #11 from Example 3 was used to make three separate formulations containing sodium bicarbonate (Sample #13), acetic acid (Sample #14) and a mixture of sodium bicarbonate and acetic acid (Sample #15). The data are shown in Table 4 below.

TABLE 4

| Sample No. | #13 | #14 | #15 |
|---|---|---|---|
| Base fluid, bbl | 1.0 | 1.0 | 1.0 |
| Sodium bicarbonate, lb | 1.5 | — | 1.5 |
| Acetic acid, lb | — | 1.5 | 1.5 |
| PAAm/PAA/AMPA (60/30/10), LB | 2.0 | 2.0 | 2.0 |
| Calcium chloride, lb | 4.2 | 4.2 | 4.2 |
| Rheological Properties | | | |
| PV | 11 | 10 | 26 |
| YP | 10 | 11 | 14 |
| 10 sec gel/10 min gel | 12/26 | 12/17 | 10/26 |
| pH | 8.0 | 4.5 | 8.5 |
| API filtrate, ml/30 min | 45 | 75 | 8 |
| Region classification | I | I | IV |

As can be seen from the data above in Table 4, the addition of either sodium bicarbonate or acetic acid along with the copolymer is not as effective a combination as the use of all three. Note, for example, the YP and API filter loss of Sample #15 compared with Samples #13 and #14.

EXAMPLE 5

To further illustrate the effectiveness of the present invention, the base fluid of Example 1 was used to make two separate formulations contaminated with 5 pounds per barrel of Portland cement. One of the formulations (Sample #16) contained none of the additives of the present invention while the other formulations (Sample #17) incorporated the addition of the present invention. The results are shown in Table 5 below.

TABLE 5

| Sample No. | #16 | #17 |
|---|---|---|
| Base fluid, bbl | 1.0 | 1.0 |
| Sodium bicarbonate, lb | — | 1.5 |
| Acetic acid, lb | — | 1.5 |
| PAAm/PAA/AMPS (60/30/10), lb | — | 2.0 |
| Portland cement, lb | 5.0 | 5.0 |
| Rheological Properties | | |
| PV | 14 | 24 |
| YP | 12 | 11 |
| 10 sec/10 min gel | 17/28 | 12/18 |
| pH | 12.0 | 11.5 |
| API filtrate, ml/30 min | 40 | 17 |
| Region classification | I | IV |

As can be seen from the above, even when the calcium contamination results from Portland cement which would commonly be encountered in drilling through formations resulting from cementing operations during casing setting or the like, the use of the additive of the present invention in formulating the In treating a PHPA servicing fluid using the compositions and method of the present invention, it is necessary that the integrity of the drilling fluid both as to rheological and other properties be maintained. In general, the two most important properties of a drilling fluid are (1) standard API filter loss (loss temperature/-low pressure) and (2) yield point (YP). In theory, these two criteria can be considered as two fixed axes, "YP" being the ordinate and "API filter loss" being the abscissa. If it is then assumed that the two rheological properties of a base fluid form the origin, we can divide the area bounded by the ordinate and the abscissa into four regions (Regions I, II, III and IV) to represent four different combinations or correlations of the two rheological properties of a drilling fluid after treatment according to the present invention. The four combinations are illustrated as follows:

| Region Number | I | II | III | IV |
|---|---|---|---|---|
| API filtrate, ml | + | + | − | − |
| YP, lb/100 ft$^2$ | + | − | − | + |

"+" and "−" indicate an increase and a decrease, respectively, in the criteria as compared to that of the base fluid. For example, fluids which exhibit an increase in API filter loss, and a decrease in YP after the base fluid is treated would fall in Region II, it being appreciated that other combinations will fall in different regions accordingly.

Generally speaking, an increase in API filter loss indicates flocculation in the drilling fluid. A decrease in yield point often indicates dispersion of colloidal aggregates in the fluid due to the addition of a deflocculant or dispersant. An increase in the API filter loss and a decrease in yield point are undesirable. Thus, such results would evidence that pre-treatment of the base fluid for calcium contamination would not be effective.

In the table above, Region I and Region III contain undesirable criteria. Region I involves an increase in API filter loss (undesirable) and an increase in yield point (desirable), while Region III involves a decrease in yield point (undesirable) and a decrease in API filter loss (desirable). Ideally, if treatment or formulation of the base fluid can result in a decrease in API filter loss and an increase in yield point after the fluid is contaminated with calcium, the fluid will fall into Region IV, the most desirable region.

In order to more fully demonstrate the invention, the following non-limiting examples are presented:

EXAMPLE 1

A representative drilling mud containing PHPA was used for testing several additives and methods. The composition of the base fluid was as follows:
302 ppb tap water
10 ppb bentonite clay
14 ppb sea salt
200 ppb barite (weighting agent)
1.0 ppb PHPA*
(pH was adjusted to 8.5-9.5 with potassium or sodium hydroxide)
In this and all following examples, the compositions were prepared in a standard 350 ml laboratory barrel. All calculations were made assuming 1 g/1 ml of water, 1 ppb equals 1 g/350 ml in a laboratory barrel.
*PHPA used was a 30% partially hydrolyzed polyacrylamide with an average molecular weight greater than 1 million.

The base fluid above, free of calcium contamination, and contaminated with 5,000 parts per million of calcium from calcium chloride (4.2 ppb) was compared as to rheological properties to demonstrate the effect of calcium ion on the fluid. Table 1 below gives a comparison of the rheological properties of the drilling fluid with and without calcium contamination.

TABLE 1

| Sample No. | #1 | #2 |
|---|---|---|
| Base fluid, bbl | 1.0 | 1.0 |
| Calcium chloride, lb (5000 ppm Ca) | — | 4.2 |
| Rheological Properties | | |
| Mud weight, lbs/gal | 12.3 | 12.3 |
| PV*, cp | 12 | 10 |
| YP*, lbs/100 ft$^2$ | 9 | 5 |
| 10 sec/10 min gel | 8/20 | 14/20 |
| pH | 8.5 | 11.5 |
| API filtrate, ml/30 min | 20 | 60 |
| Region Classification | Origin | II |

*PV: Plastic viscosity; YP: Yield point; 10 sec gel and 10 min gel: lbs/100 ft$^2$
Rheological properties were determined according to the American Petroleum Institute document, API RP 13B, Section 2.

As can be seen from the data in Table 1, Sample #2, contaminated with 5,000 ppm calcium ion, shows a notable increase of API filter loss as compared with Sample #1 (the base fluid) uncontaminated with calcium. This increase in API filter loss is due to severe flocculation of the PHPA caused by reaction with the calcium. More specifically, Sample #2 in Table 1, which shows a significant increase in API filter loss and a decrease in yield point, falls into Region II, the most undesirable region.

EXAMPLE 2

The base fluid prepared, as per Example 1, was formulated with various additives to determine their effect on the rheological properties of the base fluid when contaminated with calcium. In all cases, the sample fluids were contaminated with excess calcium ion (5,000 ppm) from calcium chloride. The effectiveness of the additives as to calcium sequestration was determined by comparing the rheological properties of the fluids. The data is shown in Table 2 below.

TABLE 2

| Sample No. | #3 | #4 | #5 |
|---|---|---|---|
| Base fluid, bbl | 1.0 | 1.0 | 1.0 |
| Sodium becarbonate, lb | 1.5 | — | 1.5 |
| Acetic acid, lb | — | 1.5 | 1.5 |
| Calcium chloride, lb | 4.2 | 4.2 | 4.2 |
| Rheological Properties | | | |
| PV | 11 | 9 | 10 |
| YP | 13 | 15 | 16 |
| 10 sec/10 min gel | 14/25 | 15/26 | 18/30 |
| pH | 7.5 | 5.5 | 7.5 |
| API filtrate, ml/30 min | 45 | 68 | 52 |
| Region Classification | I | I | I |

As can be seen from the data in Table 2, none of the additives, e.g. sodium bicarbonate or acetic acid, resulted in any significant improvement in reducing API filter loss as compared with the base fluid (Sample #1 in Table 1). Indeed, the high fluid loss of the Sample indicates that severe flocculation of the PHPA occurred even after the base fluid was treated with the additives. As can be seen, all of the formulations above fall into Region I, an undesirable region.

such as in completion, workover and other such operations where the servicing fluid would encounter a high calcium ion environment. The aqueous well servicing fluid of the present invention, in addition to containing the usual components to control viscosity, fluid loss and other such properties, will contain a partially hydrolyzed polyacrylamide (PHPA). It will be appreciated that in the case where the well servicing fluid is a drilling fluid, in addition to viscosifiers and fluid loss control additives, weighting agents and other commonly employed drilling fluid additives will also be incorporated into the fluid. The PHPA materials used in well servicing fluids, especially drilling fluids, are most effective when the degree of hydrolysis is from around 20 to around 40% by weight, especially around 30% by weight. Generally speaking, the PHPA should have a minimum average molecular weight of about 1 million, preferably a minimum of about 2 million. Thus, while the PHPA can have a molecular weight varying from 1 to about 20 million, it is preferred that the PHPA have a molecular weight of from about 5 to about 10 million. The structure and synthesis of suitable PHPA materials for use in the aqueous based well servicing fluids of the present invention is described in an article entitled "Design and Synthesis of Shale Stabilizing Polymers for Water-Based Drilling Fluids," J. J. Scheu and A. C. Perricone, presented at the 63rd Annual Technical Conference and Exhibition of the Society of Petroleum Engineers held in Houston, Tex. on Oct. 2-5, 1988.

In general, the well servicing fluid will contain the PHPA polymer in an amount of from about 0.2 to about 5 pounds per barrel (ppb) of the fluid, where a barrel is defined as 42 gallons.

In addition to an aqueous medium, e.g. water, and PHPA, the well servicing fluids of the present invention will also contain a calcium-controlling additive. The calcium-controlling additive is comprised of three main components viz. an alkali metal bicarbonate, a water-soluble carboxylic acid and a copolymer of acrylamide, an acrylic acid and 2-acrylamido-2-methylpropanesulfonic acid.

The alkali metal bicarbonate used in the calcium-controlling additive can be sodium bicarbonate, potassium bicarbonate, lithium bicarbonate, etc. or a mixture thereof and will generally be present in the well servicing fluid in an amount of from about 0.1 to about 2.5 pounds per barrel of the fluid.

The water-soluble carboxylic acid used in the calcium-controlling additive will generally be a low molecular weight organic acid which can be monocarboxylic or polycarboxylic and can include, without limitation, acids, such as formic acid, acetic acid, propionic acid, oxalic acid, malonic acid, succinic acid, adipic acid, citric acid, etc. Generally speaking, carboxylic acids useful in the present invention will contain from about 1 to about 6 carbon atoms, monocarboxylic acids having from about 1 to about 3 carbon atoms and polycarboxylic acids having from about 2 to about 6 carbon atoms being preferred. The water-soluble carboxylic acid will be present in the well servicing fluid in an amount of from about 0.1 to about 2.5 pounds per barrel of the fluid. An especially preferred carboxylic acid for use in the present invention is acetic acid, although dicarboxylic acids, such as oxalic acid, and tricarboxylic acids, such as citric acid, can also be advantageously employed.

The third component of the calcium controlling additive is a copolymer of acrylamide, an acrylic acid and 2-acrylamido-2-methylpropanesulfonic acid. The copolymer will generally contain from about 40 to about 70% by weight acrylamide, from about 20 to about 40% by weight of the acrylic acid and from about 5 to about 20% by weight of 2-acrylamido-2-methylpropanesulfonic acid and have an average molecular weight of from about 5 to about 10 million. Preferably, the copolymer will employ acrylic acid itself, the weight ratio of acrylamide to acrylic acid to the 2-acrylamido-2-methylpropanesulfonic acid preferably being about 60:30:10, respectively. The copolymer will be used in the well servicing fluid in an amount of from about 0.1 to about 1.5 pounds per barrel of the fluid.

The calcium-containing additive itself, when sold or marketed as an additive, will contain from about 2 to about 60% by weight of the alkali metal bicarbonate, from about 2 to about 60% by weight of the water-soluble carboxylic acid and from about 2 to about 30% by weight of the copolymer described above. Although the additive can be made from the dry copolymer, it is generally more convenient to formulate the additive from an aqueous emulsion of the copolymer, the emulsion containing approximately 25% by weight of the copolymer.

In order to prepare the drilling fluid of the present invention, the ingredients of the calcium-controlling additive can be added individually to the aqueous well servicing fluid. Alternatively, the additive, i.e. the mixture of the alkali metal bicarbonate, the water-soluble carboxylic acid and the copolymer, can be added in an effective amount to the well servicing fluid, an effective amount being that amount needed to sequester or otherwise prevent interaction between the calcium ions and the PHPA sufficient to result in substantial flocculation or precipitation of the PHPA from the drilling fluid.

The present invention also provides an effective method for pre-treating a PHPA containing drilling fluid which is to be used in high calcium environments. Generally speaking, in the drilling of oil and gas wells, the calcium content is considered to be high and deleterious to PHPA containing well servicing fluids at a level of from about 500 to about 5,000 parts per million, calculated as calcium. Moreover, it is well known to those skilled in the art that the calcium level of the downhole environment, either due to the formation itself or as a result of cementing operations, can be easily determined and the drilling or servicing fluid treated accordingly according to the present invention to prevent precipitation or flocculation of the PHPA by the calcium ions. Moreover, since the calcium concentration of the drilling or servicing fluid can be continuously monitored while in use, the servicing fluid can be continuously treated with the additive of the present invention, as needed, to ensure sequestration of the calcium ions and prevent precipitation of the PHPA. Accordingly, the present invention eliminates the necessity to replace calcium contaminated PHPA mud with fresh mud, an expensive and time-consuming process. In cases where the calcium concentration to be encountered is known, the additive can be added to the drilling fluid so as to provide an alkali metal bicarbonate level of from about 0.2 to about 0.7 pounds per barrel per thousand parts per million of calcium, a water-soluble carboxylic acid level from about 0.3 to about 0.7 pounds per barrel per thousand parts per million of calcium, and a copolymer level of from about 0.1 to about 0.3 pounds per barrel per thousand parts per million of calcium.

drilling mud results in a drilling mud which is unaffected by high calcium content to the extent that there is no substantial effect on API filter loss or yield point as compared with the drilling fluid which has not been contaminated with calcium.

The invention may be embodied in other specific forms without departing from the spirit or essential characteristics thereof. The foregoing embodiments are therefore to be considered, in all respects, as illustrative and not restrictive, the scope of the invention being indicated by the appended claims rather than by the foregoing description, and all changes which come within the meaning and range of equivalence of the claims are therefore intended to be embraced therein.

What is claimed is:

1. A well servicing fluid comprising an aqueous medium, from about 0.2 to about 5 pounds per barrel of a partially hydrolyzed homopolymer of acrylamide having an average molecular weight greater than 1 million, and a calcium-controlling additive comprising (a) from about 0.1 to about 2.5 pounds per barrel of said fluid of an alkali metal bicarbonate, (b) from about 0.1 to about 2.5 pounds per barrel of said fluid of a water-soluble, carboxylic acid, and (c) from about 0.1 to about 1.5 pounds per barrel of said fluid of a terpolymer containing from about 40 to about 70% by weight acrylamide, from about 20 to about 40% by weight of an acrylic acid and from about 5 to about 20% by weight of 2-acrylamido-2-methylpropanesulfonic acid, said terpolymer having an average molecular weight of from about 5 to about 10 million.

2. The well servicing fluid of claim 1 wherein said terpolymer contains acrylamide, acrylic acid and 2-acrylamido-2-methylpropanesulfonic acid in a weight ratio of about 60:30:10, respectively.

3. The well servicing fluid of claim 1 wherein said carboxylic acid comprises a monocarboxylic acid.

4. The well servicing fluid of claim 3 wherein said monocarboxylic acid comprises acetic acid.

5. The well servicing fluid of claim 1 wherein said carboxylic acid comprises a dicarboxylic acid.

6. The well servicing fluid of claim 1 wherein said partially hydrolyzed polyacrylamide has a molecular weight of from about 5 to about 10 million.

7. The well servicing fluid of claim 1 containing in addition a clay viscosifier.

8. The well servicing fluid of claim 1 containing, in addition, a barite weighting material.

9. An additive for well servicing fluids containing a partially hydrolyzed homopolymer of acrylamide for use in down hole environments containing a high calcium ion content comprising:
   from about 2 to about 60% by weight of an alkali metal bicarbonate;
   from about 2 to about 60% by weight of a water-soluble carboxylic acid; and
   from about 2 to about 30% by weight of a terpolymer containing from about 40 to about 70% weight acrylamide, from about 20 to about 40% by weight of an acrylic acid and from about 5 to about 20% by weight of 2-acrylamido-2-methylpropanesulfonic acid.

10. The additive of claim 9 wherein said alkali metal bicarbonate comprises sodium bicarbonate.

11. The additive of claim 9 wherein said carboxylic acid comprises acetic acid.

12. The additive of claim 9 wherein said terpolymer contains acrylamide, acrylic acid and 2-acrylamido-2-methylpropanesulfonic acid in an approximate weight ratio of about 60:30:10, respectively.

13. The additive of claim 9 wherein said terpolymer is present as an aqueous emulsion containing approximately 25% by weight of said copolymer.

14. A method of treating an aqueous well servicing fluid containing partially hydrolyzed polyacrylamide to prevent unwanted reactions between calcium ions and said partially hydrolyzed polyacrylamide comprising adding to said well servicing fluid an effective amount of the additive of claim 9.

15. The method of claim 14 wherein said copolymer contains acrylamide, acrylic acid and 2-acrylamido-2-methylpropanesulfonic acid in a weight ratio of about 60:30:10, respectively.

16. The method of claim 14 wherein said carboxylic acid comprises a monocarboxylic acid.

17. The well servicing fluid of claim 3 wherein said monocarboxylic acid comprises acetic acid.

18. The method of claim 14 wherein said carboxylic acid comprises a dicarboxylic acid.

19. The method of claim 14 wherein said partially hydrolyzed polyacrylamide has a molecular weight of from about 5 to about 10 million.

20. The method of claim 14 wherein the amount of said additive is from about 0.3 to about 7 ppb of said fluid.

* * * * *

UNITED STATES PATENT AND TRADEMARK OFFICE
CERTIFICATE OF CORRECTION

PATENT NO. : 5,028,341

DATED : July 2, 1991

INVENTOR(S) : Andrew Liao

It is certified that error appears in the above-identified patent and that said Letters Patent is hereby corrected as shown below:

Column 10, (claim 13) line 25, change "copolymer" to "terpolymer".

Signed and Sealed this

Twentieth Day of October, 1992

Attest:

DOUGLAS B. COMER

*Attesting Officer*   *Acting Commissioner of Patents and Trademarks*